(12) United States Patent
Jiang et al.

(10) Patent No.: US 11,895,627 B2
(45) Date of Patent: *Feb. 6, 2024

(54) DETERMINATION OF A MULTIGROUP ANTENNA CODE BOOK USING BEAMFORMING TECHNIQUES

(71) Applicants: Qi Jiang, Shanghai (CN); Xiaobo Zhang, Shanghai (CN); Lin Yang, Shanghai (CN)

(72) Inventors: Qi Jiang, Shanghai (CN); Xiaobo Zhang, Shanghai (CN); Lin Yang, Shanghai (CN)

(73) Assignee: SHANGHAI LANGBO COMMUNICATION TECHNOLOGY COMPANY LIMITED, Shanghai (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/102,722

(22) Filed: Jan. 29, 2023

(65) Prior Publication Data

US 2023/0180195 A1 Jun. 8, 2023

Related U.S. Application Data

(63) Continuation of application No. 17/029,083, filed on Sep. 23, 2020, now Pat. No. 11,678,305, which is a (Continued)

(51) Int. Cl.
*H04W 72/04* (2023.01)
*H04B 7/06* (2006.01)
*H04L 5/00* (2006.01)

(52) U.S. Cl.
CPC .......... *H04W 72/04* (2013.01); *H04B 7/0617* (2013.01); *H04L 5/0033* (2013.01); *H04L 5/0091* (2013.01)

(58) Field of Classification Search
CPC ............ H04W 72/04; H04W 72/0446; H04W 72/046; H04B 7/0617; H04B 7/0456;
(Continued)

(56) References Cited

U.S. PATENT DOCUMENTS

2021/0367719 A1\* 11/2021 Zhang ................... H04L 5/0023

FOREIGN PATENT DOCUMENTS

| CN | 104754742 A | 7/2015 |
| CN | 105610525 A | 5/2016 |

(Continued)

OTHER PUBLICATIONS

ISR in application PCT/CN2018/086823 dated Nov. 28, 2018.

*Primary Examiner* — Rushil P. Sampat

(57) ABSTRACT

The disclosure provides a method and a device in a User Equipment (UE) and a base station for wireless communication. The UE receives first information, and transmits a first radio signal using a first antenna port group; the first information is used for indicating a first offset set, and the first offset set includes K1 first-type offset(s); time domain resources occupied by the first radio signal start from a first time, a time interval between the first time and a second time is equal to a target offset; the UE selects the target offset from the K1 first-type offset(s) autonomously. The disclosure establishes a relationship between the first offset set and the first antenna port group, thus improving opportunities of beamforming based grant-free data transmission on unlicensed spectrum and reducing probability of collision, thereby improving spectrum efficiency and overall performances of the system.

20 Claims, 13 Drawing Sheets

Related U.S. Application Data continuation of application No. PCT/CN2018/086823, filed on May 15, 2018.

(58) Field of Classification Search
CPC .. H04B 7/0417; H04B 7/0478; H04B 7/0634; H04L 5/0033; H04L 5/0091; H04J 3/1694
See application file for complete search history.

(56) References Cited

FOREIGN PATENT DOCUMENTS

| | | |
|---|---|---|
| CN | 106993334 A | 7/2017 |
| WO | 2014022690 A2 | 2/2014 |
| WO | 2018085790 A1 | 5/2018 |

\* cited by examiner

DETERMINATION OF A MULTIGROUP ANTENNA CODE BOOK USING BEAMFORMING TECHNIQUES

CROSS REFERENCE TO RELATED APPLICATIONS

This application is a continuation of the U.S. patent application Ser. No. 17/029,083, filed on Sep. 23, 2020; now issued as U.S. Pat. No. 11,678,305, which is a continuation of International Application PCT/CN2018/086823, filed May 15, 2018, the full disclosure of which is incorporated herein by reference.

BACKGROUND

Technical Field

The disclosure relates to transmission methods and devices in wireless communication systems, and in particular to a method and a device for transmission of data and control channels on unlicensed spectrum.

Related Art

In conventional 3rd Generation Partner Project (3GPP) Long Term Evolution (LTE) systems, data transmission can occur on licensed spectrum only. However, with the increasing diversification of application scenarios and the sharp increase of services, the conventional licensed spectrum probably is difficult to meet the requirements of the services. In LTE Release 13 and Release 14, communication on unlicensed spectrum is introduced to cellular systems and it is applied to transmissions of uplink data and downlink data. In the LTE Licensed Assisted Access (LAA) design mechanism, a transmitter (base station or User Equipment (UE)) needs to perform Listen Before Talk (LBT) before transmitting data on the unlicensed spectrum, so as to avoid causing interferences to other wireless transmissions that are ongoing on the unlicensed spectrum. In order to avoid reduction of resource utilization and latency due to frequent LBT, an Autonomous Uplink (AUL) transmission mechanism is introduced to the unlicensed spectrum in Release 15. In the AUL transmission mechanism, a UE can conduct uplink transmission autonomously in air interface resources preconfigured by the base station; meanwhile, since it is possible that UEs in AUL simultaneously select one same transmission start point after passing LBT simultaneously, a concept of Start Offset is introduced in RAN1 #92 plenary, that is, different UEs are configured with different start offset groups and the UEs select start offsets from the configured start offset groups autonomously, which avoids the situation that multiple UEs in AUL select one same transmission start point to result in collision.

When LAA is applied to 5G NR (New Radio Access Technology) systems, the introduction of beamforming will make the above problem become more complicated, thus a new solution needs to be studied and proposed.

SUMMARY

A typical application scenario in 5G LAA is that a concept of beamforming is introduced to LBT, that is to say, a transmitting terminal can perform LBT in air interface resources corresponding to multiple beamforming vectors, so as to realize simultaneous transmission of multiple beams without causing interference therebetween. However, when the above method of configuring a start offset group is applied to the beamforming based LBT, it might occur that a UE in multiple beam directions select a same start offset to perform transmission; although the multiple current transmissions of the UE have no interference to each other thanks to distinguishment of different beams, as for other UEs which need to transmit data and perform LBT in subsequent time, the current transmissions will occupy all time resources, thereby resulting in an LBT failure for all other UEs performing LBT and a reduction in probability of transmission on unlicensed spectrum in beamforming scenarios.

In view of the above problems, the disclosure provides a solution. It should be noted that the embodiments of the UE of the disclosure and the characteristics in the embodiments may be applied to the base station, and vice versa. The embodiments of the disclosure and the characteristics in the embodiments may be mutually combined if no conflict is incurred.

The disclosure provides a method in a UE for wireless communication, wherein the method includes:
  receiving first information; and
  transmitting a first radio signal using a first antenna port group.

Herein, the first information is used for indicating a first offset set, and the first offset set includes K1 first-type offset(s); time domain resources occupied by the first radio signal start from a first time, a time interval between the first time and a second time is equal to a target offset, and the target offset is one of the K1 first-type offset(s); the UE selects the target offset from the K1 first-type offset(s) autonomously; the second time is a start time of a first time window; time domain resources occupied by the first radio signal belong to the first time window; the first antenna port group is related to the first offset set; the first antenna port group includes a positive integer number of antenna port(s); and the first information is transmitted through an air interface; the K1 is a positive integer.

In one embodiment, the above method has the following benefits: the first offset set is one offset set that changes with a beam, and different beams correspond to different offset sets; thus, the UE which performs uplink transmission using different beams will select different offset values, thereby avoiding the situation that one same time resource is occupied simultaneously by multiple beams to result in an LBT failure of other UEs at such time.

In one embodiment, the essence of the above method is that: through configuring different offset sets for different beams, the base station distinguishes in time domain the transmissions of uplink AUL corresponding to different beams, thereby making opportunities of transmission on AUL become more even in time domain, and avoiding the situation that LBT failure occurs in all beam directions to cause a certain time unit to be idle.

According to one aspect of the disclosure, the above method includes:
  performing an energy detection for a first frequency band.

Herein, the energy detection is used for determining that the first frequency band is unoccupied, and frequency domain resources occupied by the first radio signal belong to the first frequency band.

In one embodiment, the essence of the above method is that: the UE determines the first offset set according to a beamforming vector for energy detection, thereby autonomously determining a value of the target offset actually selected.

According to one aspect of the disclosure, the above method includes:

receiving second information.

Herein, the second information is used for indicating at least one of the first time window and frequency domain resources occupied by the first radio signal; and the second information is transmitted through an air interface.

In one embodiment, the essence of the above method is that: the base statin configures in advance for the UE time-frequency resources that the first radio signal can occupy, and the UE determines autonomously a transmission start time in the time-frequency resources.

According to one aspect of the disclosure, the above method is characterized in that: the first offset set is one subset in a first candidate offset set, the first candidate offset set includes K2 candidate offset(s), and the K2 is a positive integer not less than the K1; and at least one of the K2 or a distribution of the K2 candidate offsets in the first candidate offset set is related to a subcarrier spacing of a subcarrier included in frequency domain resources occupied by the first radio signal.

In one embodiment, the above method has the following benefits: the first candidate offset set is related to a subcarrier spacing, that is, the first offset set is related to a subcarrier spacing, and offset values are adjusted according to different subcarrier spacings so as to adapt to application scenarios corresponding to different subcarrier spacings.

According to one aspect of the disclosure, the above method is characterized in that: the first radio signal occupies a partial of one multicarrier symbol and a positive integer number of complete multicarrier symbol(s) successively in time domain, and the partial multicarrier symbol occupied by the first radio signal is a cyclic extension of an earliest complete multicarrier symbol occupied by the first radio signal.

In one embodiment, the above method has the following benefits: the partial multicarrier symbol occupied by the first radio signal is set as a Cyclic Prefix (CP), which does not damage the integrality and the CP property of the first radio signal.

The disclosure provides a method in a base station for wireless communication, wherein the method includes:

transmitting first information; and receiving a first radio signal.

Herein, the first information is used for indicating a first offset set, and the first offset set includes K1 first-type offset(s); time domain resources occupied by the first radio signal start from a first time, a time interval between the first time and a second time is equal to a target offset, and the target offset is one of the K1 first-type offset(s); a transmitter of the first radio signal selects the target offset from the K1 first-type offset(s) autonomously; the second time is a start time of a first time window; time domain resources occupied by the first radio signal belong to the first time window; a first antenna port group is related to the first offset set; the first antenna port group includes a positive integer number of antenna port(s); a transmitter of the first radio signal transmits the first radio signal using the first antenna port group; and the first information is transmitted through an air interface; the K1 is a positive integer.

According to one aspect of the disclosure, the above method includes:

transmitting second information.

Herein, the second information is used for indicating at least one of the first time window and frequency domain resources occupied by the first radio signal; and the second information is transmitted through an air interface.

According to one aspect of the disclosure, the above method is characterized in that: the first offset set is one subset in a first candidate offset set, the first candidate offset set includes K2 candidate offset(s), and the K2 is a positive integer not less than the K1; and at least one of the K2 or a distribution of the K2 candidate offsets in the first candidate offset set is related to a subcarrier spacing of a subcarrier included in frequency domain resources occupied by the first radio signal.

According to one aspect of the disclosure, the above method is characterized in that: the first radio signal occupies a partial of one multicarrier symbol and a positive integer number of complete multicarrier symbol(s) successively in time domain, and the partial multicarrier symbol occupied by the first radio signal is a cyclic extension of an earliest complete multicarrier symbol occupied by the first radio signal.

The disclosure provides a UE for wireless communication, wherein the UE includes:

a first receiver, to receive first information; and a first transceiver, to transmit a first radio signal using a first antenna port group.

Herein, the first information is used for indicating a first offset set, and the first offset set includes K1 first-type offset(s); time domain resources occupied by the first radio signal start from a first time, a time interval between the first time and a second time is equal to a target offset, and the target offset is one of the K1 first-type offset(s); the UE selects the target offset from the K1 first-type offset(s) autonomously; the second time is a start time of a first time window; time domain resources occupied by the first radio signal belong to the first time window; the first antenna port group is related to the first offset set; the first antenna port group includes a positive integer number of antenna port(s); and the first information is transmitted through an air interface; the K1 is a positive integer.

In one embodiment, the above UE for wireless communication is characterized in that: the first transceiver further performs an energy detection for a first frequency band; the energy detection is used for determining that the first frequency band is unoccupied, and frequency domain resources occupied by the first radio signal belong to the first frequency band.

In one embodiment, the above UE for wireless communication is characterized in that: the first receiver further receives second information; the second information is used for indicating at least one of the first time window and frequency domain resources occupied by the first radio signal; and the second information is transmitted through an air interface.

In one embodiment, the above UE for wireless communication is characterized in that: the first offset set is one subset in a first candidate offset set, the first candidate offset set includes K2 candidate offset(s), and the K2 is a positive integer not less than the K1; and at least one of the K2 or a distribution of the K2 candidate offsets in the first candidate offset set is related to a subcarrier spacing of a subcarrier included in frequency domain resources occupied by the first radio signal.

In one embodiment, the above UE for wireless communication is characterized in that: the first radio signal occupies a partial of one multicarrier symbol and a positive integer number of complete multicarrier symbol(s) successively in time domain, and the partial multicarrier symbol occupied by the first radio signal is a cyclic extension of an earliest complete multicarrier symbol occupied by the first radio signal.

The disclosure provides a base station for wireless communication, wherein the base station includes:

a first transmitter, to transmit first information; and a second transceiver, to receive a first radio signal.

Herein, the first information is used for indicating a first offset set, and the first offset set includes K1 first-type offset(s); time domain resources occupied by the first radio signal start from a first time, a time interval between the first time and a second time is equal to a target offset, and the target offset is one of the K1 first-type offset(s); a transmitter of the first radio signal selects the target offset from the K1 first-type offset(s) autonomously; the second time is a start time of a first time window; time domain resources occupied by the first radio signal belong to the first time window; a first antenna port group is related to the first offset set; the first antenna port group includes a positive integer number of antenna port(s); a transmitter of the first radio signal transmits the first radio signal using the first antenna port group; and the first information is transmitted through an air interface; the K1 is a positive integer.

In one embodiment, the above base station for wireless communication is characterized in that: the first transmitter further transmits second information; the second information is used for indicating at least one of the first time window and frequency domain resources occupied by the first radio signal; and the second information is transmitted through an air interface.

In one embodiment, the above base station for wireless communication is characterized in that: the first offset set is one subset in a first candidate offset set, the first candidate offset set includes K2 candidate offset(s), and the K2 is a positive integer not less than the K1; and at least one of the K2 or a distribution of the K2 candidate offsets in the first candidate offset set is related to a subcarrier spacing of a subcarrier included in frequency domain resources occupied by the first radio signal.

In one embodiment, the above base station for wireless communication is characterized in that: the first radio signal occupies a partial of one multicarrier symbol and a positive integer number of complete multicarrier symbol(s) successively in time domain, and the partial multicarrier symbol occupied by the first radio signal is a cyclic extension of an earliest complete multicarrier symbol occupied by the first radio signal.

In one embodiment, compared with conventional schemes, the disclosure has the following advantages.

The first offset set in the disclosure is one offset set that changes with a beam, and different beams correspond to different offset sets; thus, the UE which performs uplink transmission using different beams will select different offset values, thereby avoiding the situation that one same time resource is occupied simultaneously by multiple beams to result in an LBT failure of other UEs at such time.

Through configuring different offset sets for different beams, the base station distinguishes in time domain the transmissions of uplink AUL corresponding to different beams, thereby making opportunities of transmission on AUL become more even in time domain, and avoiding the situation that LBT failure occurs in all beam directions to cause a certain time unit to be idle.

The UE determines the first offset set according to a beamforming vector for energy detection, thereby autonomously determining a value of the target offset actually selected.

The first candidate offset set is related to a subcarrier spacing, that is, the first offset set is related to a subcarrier spacing, and offset values are adjusted according to different subcarrier spacings so as to adapt to application scenarios corresponding to different subcarrier spacings.

BRIEF DESCRIPTION OF THE DRAWINGS

Other features, purposes and advantages of the disclosure will become more apparent from the detailed description of non-restrictive embodiments taken in conjunction with the following drawings.

DESCRIPTION OF THE EMBODIMENTS

The technical scheme of the disclosure is described below in further detail in conjunction with the drawings. It should be noted that the embodiments in the disclosure and the characteristics of the embodiments may be mutually combined arbitrarily if no conflict is incurred.

Embodiment 1

Figure 1:
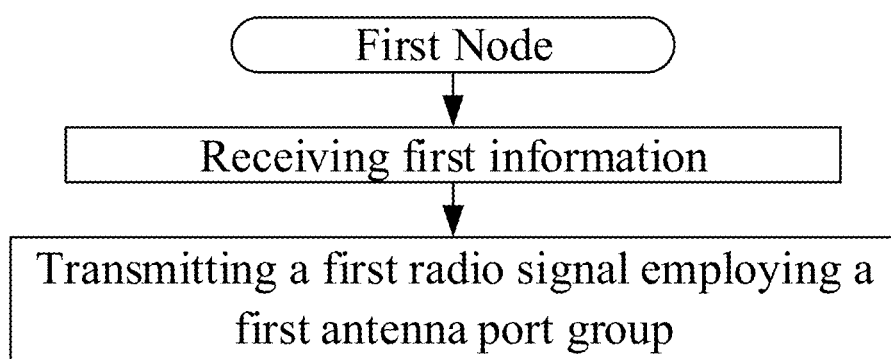
FIG. 1 is a flowchart of first information according to one embodiment of the disclosure.

Embodiment 1 illustrates a flowchart of first information, as shown in FIG. 1.

In Embodiment 1, the UE in the disclosure first receives first information, and then transmits a first radio signal using a first antenna port group; the first information is used for indicating a first offset set, and the first offset set includes K1 first-type offset(s); time domain resources occupied by the first radio signal start from a first time, a time interval between the first time and a second time is equal to a target offset, and the target offset is one of the K1 first-type offset(s); the UE selects the target offset from the K1 first-type offset(s) autonomously; the second time is a start time of a first time window; time domain resources occupied by the first radio signal belong to the first time window; the first antenna port group is related to the first offset set; the first antenna port group includes a positive integer number of antenna port(s); and the first information is transmitted through an air interface; the K1 is a positive integer.

In one subembodiment, the transmission of the first radio signal is grant free, or the transmission of the first radio signal is contention based.

In one subembodiment, any one of the K1 first-type offset(s) is in unit of microsecond.

In one subembodiment, any one of the K1 first-type offset(s) is equal to a duration of a positive integer number of multicarrier symbols(s).

In one subembodiment, a given first-type offset is any one of the K1 first-type offset(s), the given first-type offset is equal to one of {16, 25, 34, 43, 52, 61}, and the given first-type offset is in unit of microsecond.

In one subembodiment, a given first-type offset is any one of the K1 first-type offset(s), the given first-type offset is equal to L*T, where the L is a positive integer not greater than 14, and the T is a duration of one multicarrier symbol.

In one subembodiment, the multicarrier symbol in the disclosure is one of an Orthogonal Frequency Division Multiplexing (OFDM) symbol, a Single-Carrier Frequency Division Multiple Access (SC-FDMA) symbol, a Filter Bank Multi Carrier (FBMC) symbol, an OFDM symbol including a CP, or a Discrete Fourier Transform Spreading Orthogonal Frequency Division Multiplexing (DFT-s-OFDM) symbol including a CP.

In one subembodiment, frequency domain resources occupied by the first radio signal belong to unlicensed spectrum.

In one subembodiment, the phrase that the UE selects the target offset from the K1 first-type offset(s) autonomously refers that: the UE selects randomly one first-type offset from the K1 first-type offset(s) as the target offset.

In one subembodiment, the first information is one Radio Resource Control (RRC) signaling.

In one subembodiment, the first information is cell specific.

In one subembodiment, the first information is specific to a terminal group, and the UE belongs to the terminal group.

In one subembodiment, the first information is transmitted through a radio signal between a base station and the UE.

In one subembodiment, the first antenna port group corresponds to one Sounding Reference Signaling Resource Indicator (SRI).

In one subembodiment, the first antenna port group corresponds to one Physical Random Access Channel (PRACH) resource.

In one subembodiment, the first antenna port group corresponds to a first spatial transmitting parameter, and the first spatial transmitting parameter includes one of a transmitting analog beamforming vector, a transmitting beamforming vector or a transmitting analog beamforming matrix.

In one subembodiment, the UE includes M1 first-type antenna port group(s), the first antenna port group is one of M1 first-type antenna port group(s), the M1 first-type antenna port group(s) is(are) one-to-one corresponding to M1 target offset set(s), and the first offset set is a target offset set among the M1 target offset set(s) that is corresponding to the first antenna port group.

In one affiliated embodiment of the above subembodiment, any one of the M1 target offset set(s) includes a positive integer number of target offset(s).

In one example of the above affiliated embodiment, any one of the positive integer number of target offset(s) is in unit of microsecond, or any one of the positive integer number of target offset(s) is equal to a duration of a positive integer number of multicarrier symbol(s).

In one example of the above affiliated embodiment, any one of the positive integer number of target offset(s) is a positive integer.

In one affiliated embodiment of the above subembodiment, a first target offset set and a second target offset set are any two different target offset sets among the M1 target offset sets, and at least one target offset in the first target offset set does not belong to the second target offset set.

In one affiliated embodiment of the above subembodiment, a first target offset set and a second target offset set are any two different target offset sets among the M1 target offset sets, and any one target offset in the first target offset set does not belong to the second target offset set.

In one affiliated embodiment of the above subembodiment, the M1 first-type antenna port groups are all transmitting antenna port groups of the UE.

In one affiliated embodiment of the above subembodiment, the M1 first-type antenna port groups correspond to M1 SRIs respectively.

In one affiliated embodiment of the above subembodiment, the M1 first-type antenna port groups correspond to M1 Channel State Information Reference Signal Resource Indicators (CRIs) respectively.

In one affiliated embodiment of the above subembodiment, the M1 first-type antenna port groups correspond to M1 SS/PBCH Blocks (SSBs) respectively.

In one subembodiment, the first radio signal is transmitted on a Physical Uplink Shared Channel (PUSCH).

In one subembodiment, a transport channel corresponding to the first radio signal is an Uplink Shared Channel (UL-SCH).

In one subembodiment, the first antenna port group includes one antenna port only.

Embodiment 2

Figure 2:
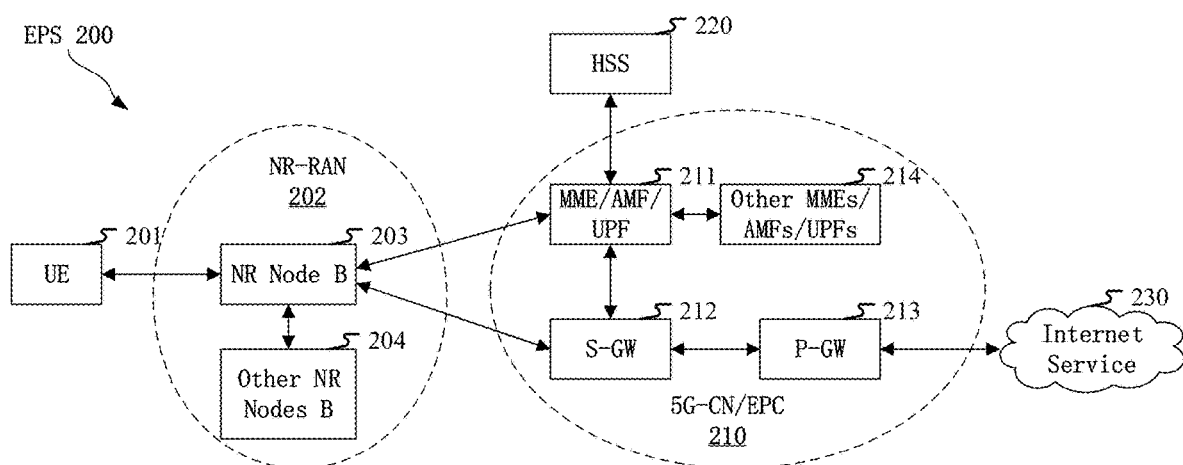
FIG. 2 is a diagram illustrating a network architecture according to one embodiment of the disclosure.

Embodiment 2 illustrates a diagram of a network architecture, as shown in FIG. 2.

Embodiment 2 illustrates a diagram of a network architecture according to the disclosure, as shown in FIG. 2. FIG. 2 is a diagram illustrating a network architecture 200 of NR 5G, Long-Term Evolution (LTE), Long-Term Evolution Advanced (LTE-A) systems. The NR 5G or LTE network architecture 200 may be called an Evolved Packet System (EPS) 200 or some other appropriate terms. The EPS 200 may include one or more UEs 201, an NG-RAN 202, a 5G-Core Network/Evolved Packet Core (5G-CN/EPC) 210, a Home Subscriber Server (HSS) 220 and an Internet Service 230. The EPS may be interconnected with other access networks. For simple description, the entities/interfaces are not shown. As shown in FIG. 2, the EPS provides packet switching services. Those skilled in the art are easy to understand that various concepts presented throughout the disclosure may be extended to networks providing circuit switching services or other cellular networks. The NG-RAN includes an NR node B (gNB) 203 and other gNBs 204. The gNB 203 provides UE 201 oriented user plane and control plane protocol terminations. The gNB 203 may be connected to other gNBs 204 via an Xn interface (for example, backhaul). The gNB 203 may also be called a base station, a base transceiver station, a radio base station, a radio transceiver, a transceiver function, a Basic Service Set (BSS), an Extended Service Set (ESS), a Transmitter Receiver Point (TRP) or some other appropriate terms. The gNB 203 provides an access point of the 5G-CN/EPC 210 for the UE 201. Examples of the UE 201 include cellular phones, smart phones, Session Initiation Protocol (SIP)

phones, laptop computers, Personal Digital Assistants (PDAs), Satellite Radios, non-terrestrial base station communications, satellite mobile communications, Global Positioning Systems (GPSs), multimedia devices, video devices, digital audio player (for example, MP3 players), cameras, games consoles, unmanned air-interface vehicles, air vehicles, narrow-band physical network equipment, machine-type communication equipment, land vehicles, automobiles, wearable equipment, or any other devices having similar functions. Those skilled in the art may also call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected to the 5G-CN/EPC 210 via an S1/NG interface. The 5G-CN/EPC 210 includes a Mobility Management Entity/Authentication Management Field/User Plane Function (MME/AMF/UPF) 211, other MMEs/AMFs/UPFs 214, a Service Gateway (S-GW) 212 and a Packet Data Network Gateway (P-GW) 213. The MME/AMF/UPF 211 is a control node for processing a signaling between the UE 201 and the 5G-CN/EPC 210. Generally, the MME/AMF/UPF 211 provides bearer and connection management. All user Internet Protocol (IP) packets are transmitted through the S-GW 212. The S-GW 212 is connected to the P-GW 213. The P-GW 213 provides UE IP address allocation and other functions. The P-GW 213 is connected to the Internet service 230. The Internet service 230 includes IP services corresponding to operators, specifically including Internet, Intranet, IP Multimedia Subsystems (IMSs) and Packet Switching Streaming Services (PSSs).

In one subembodiment, the UE 201 corresponds to the UE in the disclosure.

In one subembodiment, the gNB 203 corresponds to the base station in the disclosure.

In one subembodiment, the UE 201 is a terminal supporting wireless communications on unlicensed spectrum.

In one subembodiment, the UE 201 is a terminal supporting AUL transmission.

In one subembodiment, the UE 201 is a terminal supporting beamforming.

In one subembodiment, the UE 201 is a terminal supporting narrow band LBT.

In one subembodiment, the gNB 203 supports wireless communications on unlicensed spectrum.

In one subembodiment, the gNB 203 supports AUL transmission.

In one subembodiment, the gNB 203 supports beamforming based uplink transmission.

Embodiment 3

Figure 3:
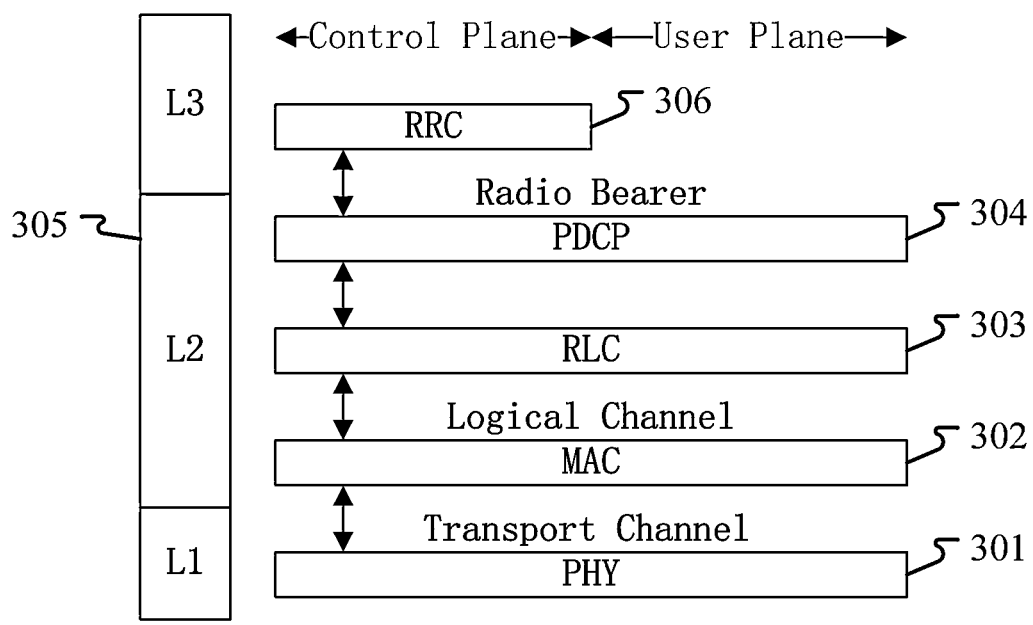
FIG. 3 is a diagram illustrating an embodiment of a radio protocol architecture of a user plane and a control plane according to one embodiment of the disclosure.

Embodiment 3 illustrates a diagram of an embodiment of a radio protocol architecture of a user plane and a control plane according to the disclosure, as shown in FIG. 3.

FIG. 3 is a diagram illustrating an embodiment of a radio protocol architecture of a user plane and a control plane. In FIG. 3, the radio protocol architecture of a UE and a gNB is represented by three layers, which are a Layer 1, a Layer 2 and a Layer 3 respectively. The Layer 1 (L1 layer) 301 is the lowest layer and implements various PHY (physical layer) signal processing functions. The L1 layer will be referred to herein as the PHY 301. The Layer 2 (L2 layer) 305 is above the PHY 301, and is responsible for the link between the UE and the gNB over the PHY 301. In the user plane, the L2 layer 305 includes a Medium Access Control (MAC) sublayer 302, a Radio Link Control (RLC) sublayer 303, and a Packet Data Convergence Protocol (PDCP) sublayer 304, which are terminated at the gNB on the network side. Although not shown in FIG. 3, the UE may include several higher layers above the L2 layer 305, including a network layer (i.e. IP layer) terminated at the P-GW on the network side and an application layer terminated at the other end (i.e. a peer UE, a server, etc.) of the connection. The PDCP sublayer 304 provides multiplexing between different radio bearers and logical channels. The PDCP sublayer 304 also provides header compression for higher-layer packets so as to reduce radio transmission overheads. The PDCP sublayer 304 provides security by encrypting packets and provides support for UE handover between gNBs. The RLC sublayer 303 provides segmentation and reassembling of higher-layer packets, retransmission of lost packets, and reordering of lost packets to as to compensate for out-of-order reception due to HARQ. The MAC sublayer 302 provides multiplexing between logical channels and transport channels. The MAC sublayer 302 is also responsible for allocating various radio resources (i.e., resource blocks) in one cell among UEs. The MAC sublayer 302 is also in charge of HARQ operations. In the control plane, the radio protocol architecture of the UE and the gNB is almost the same as the radio protocol architecture in the user plane on the PHY 301 and the L2 layer 305, with the exception that there is no header compression function for the control plane. The control plane also includes a Radio Resource Control (RRC) sublayer 306 in the layer 3 (L3). The RRC sublayer 306 is responsible for acquiring radio resources (i.e. radio bearers) and configuring lower layers using an RRC signaling between the gNB and the UE.

In one subembodiment, the radio protocol architecture shown in FIG. 3 is applicable to the UE in the disclosure.

In one subembodiment, the radio protocol architecture shown in FIG. 3 is applicable to the base station in the disclosure.

In one subembodiment, the first radio signal in the disclosure is generated on the PHY 301.

In one subembodiment, the first radio signal in the disclosure is generated on the MAC sublayer 302.

In one subembodiment, the first information in the disclosure is generated on the RRC sublayer 306.

In one subembodiment, the second information in the disclosure is generated on the RRC sublayer 306.

Embodiment 4

Figure 4:
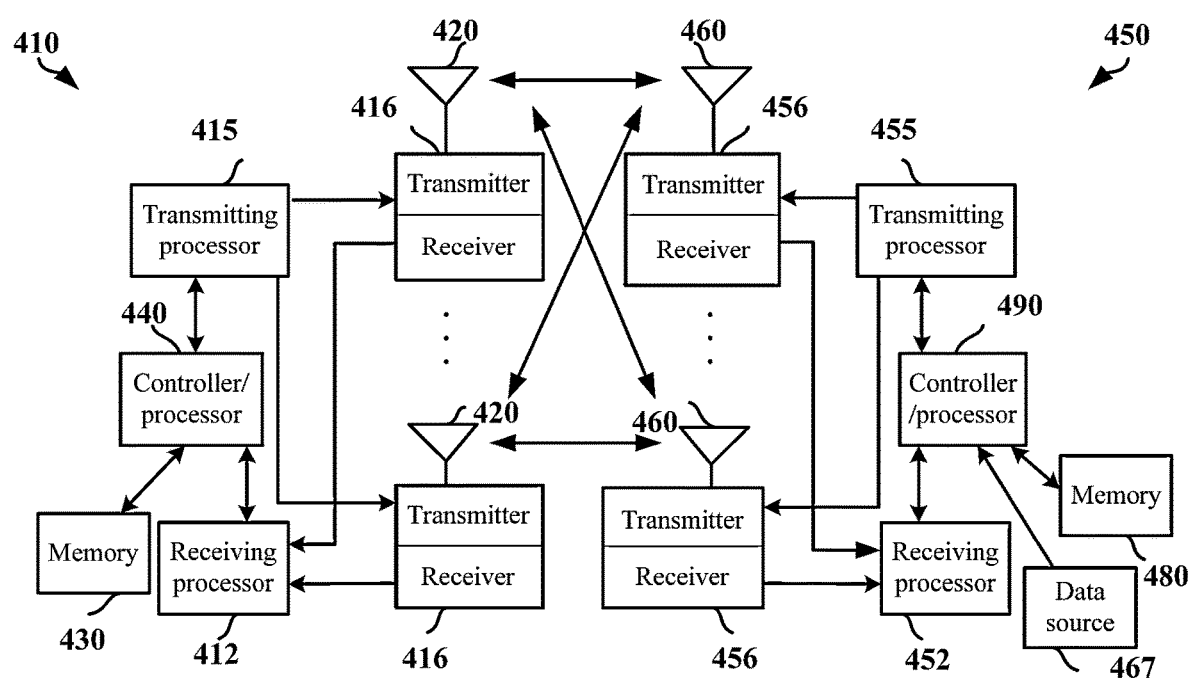
FIG. 4 is a diagram illustrating an evolved node B and a UE according to one embodiment of the disclosure.

Embodiment 4 illustrates a diagram of a base station and a UE according to the disclosure, as shown in FIG. 4. FIG. 4 is a block diagram of a gNB 410 in communication with a UE 450 in an access network.

The base station 410 includes a controller/processor 440, a memory 430, a receiving processor 412, a transmitting processor 415, a transmitter/receiver 416 and an antenna 420.

The UE 450 includes a controller/processor 490, a memory 480, a data source 467, a transmitting processor 455, a receiving processor 452, a transmitter/receiver 456 and an antenna 460.

In uplink transmission, processes relevant to the base station 410 include the following.

The receiver 416 receives a radio-frequency signal through the corresponding antenna 420, converts the received radio-frequency signal into a baseband signal, and provides the baseband signal to the receiving processor 412.

The receiving processor 412 performs various signal receiving processing functions of L1 layer (that is, PHY), such as decoding, de-interleaving, descrambling, demodulation, extraction of physical layer control signalings, etc.

The receiving processor 412 performs various signal receiving processing functions of L1 layer (that is, PHY), such as multiantenna receiving, despreading, code division multiplexing, precoding, etc.

The controller/processor 440 performs functions of L2 layer, and is connected to the memory 430 that stores program codes and data.

The controller/processor 440 provides multiplexing between a transport channel and a logical channel, packet reassembling, decryption, header decompression, and control signal processing so as to recover a higher-layer packet coming from the UE 450. The higher-layer packet from the controller/processor 440 may be provided to a core network.

The controller/processor 440 determines possible target air interface resources occupied by a target radio signal, and transmits the result to the receiving processor 412; determines through a blind detection whether the target uplink signal occupies the target air interface resources, the target radio signal including the first radio signal in the disclosure, the target air interface resources including at least one of time domain resources, frequency resources or spatial resources occupied by the first radio signal, and the spatial resources corresponding to the first antenna port group; and determines a spatial receiving parameter receiving the first radio signal according to the first antenna port group.

In UL transmission, processes relevant to the UE 450 include the following.

The data source 467 provides a higher-layer packet to the controller/processor 490. The data source 467 represents all protocol layers above L2 layer.

The transmitter 456 transmits a radio-frequency signal through the corresponding antenna 460, converts a baseband signal into a radio-frequency signal and provides the radio-frequency signal to the corresponding antenna 460.

The transmitting processor 455 performs various signal transmitting processing functions of L1 layer (that is, PHY), including encoding, interleaving, scrambling, modulation, generation of physical layer signalings, etc.

The transmitting processor 455 performs various signal transmitting processing functions of L1 layer (that is, PHY), including multiantenna transmitting, spreading, code division multiplexing, precoding, etc.

The controller/processor 490 performs header compression, encryption, packet segmentation and reordering, and multiplexing between a logical channel and a transport channel based on the radio resource allocation of the gNB 410, and performs functions of Layer 2 used for the user plane and the control plane.

The controller/processor 490 is also in charge of HARQ operation, retransmission of lost packets, and signalings to the eNB 410.

The controller/processor 490 determines autonomously target air interface resources occupied by a target radio signal, and transmits the result to the transmitting processor 455, the target radio signal including the first radio signal in the disclosure, the target air interface resources including at least one of time domain resources, frequency resources or spatial resources occupied by the first radio signal, and the spatial resources corresponding to the first antenna port group.

In one subembodiment, the UE 450 includes at least one processor and at least one memory. The at least one memory includes computer program codes. The at least one memory and the computer program codes are configured to be used in collaboration with the at least one processor. The UE 450 at least receives first information, and transmits a first radio signal using a first antenna port group; the first information is used for indicating a first offset set, and the first offset set includes K1 first-type offset(s); time domain resources occupied by the first radio signal start from a first time, a time interval between the first time and a second time is equal to a target offset, and the target offset is one of the K1 first-type offset(s); the UE selects the target offset from the K1 first-type offset(s) autonomously; the second time is a start time of a first time window; time domain resources occupied by the first radio signal belong to the first time window; the first antenna port group is related to the first offset set; the first antenna port group includes a positive integer number of antenna port(s); and the first information is transmitted through an air interface.

In one subembodiment, the UE 450 includes a memory that stores a computer readable instruction program. The computer readable instruction program generates an action when executed by at least one processor. The action includes: receiving first information, and transmitting a first radio signal using a first antenna port group; the first information is used for indicating a first offset set, and the first offset set includes K1 first-type offset(s); time domain resources occupied by the first radio signal start from a first time, a time interval between the first time and a second time is equal to a target offset, and the target offset is one of the K1 first-type offset(s); the UE selects the target offset from the K1 first-type offset(s) autonomously; the second time is a start time of a first time window; time domain resources occupied by the first radio signal belong to the first time window; the first antenna port group is related to the first offset set; the first antenna port group includes a positive integer number of antenna port(s); and the first information is transmitted through an air interface.

In one subembodiment, the gNB 410 device includes at least one processor and at least one memory. The at least one memory includes computer program codes. The at least one memory and the computer program codes are configured to be used in collaboration with the at least one processor. The gNB 410 device at least transmits first information, and receives a first radio signal; the first information is used for indicating a first offset set, and the first offset set includes K1 first-type offset(s); time domain resources occupied by the first radio signal start from a first time, a time interval between the first time and a second time is equal to a target offset, and the target offset is one of the K1 first-type offset(s); a transmitter of the first radio signal selects the target offset from the K1 first-type offset(s) autonomously; the second time is a start time of a first time window; time domain resources occupied by the first radio signal belong to the first time window; a first antenna port group is related to the first offset set; the first antenna port group includes a positive integer number of antenna port(s); a transmitter of the first radio signal transmits the first radio signal using the first antenna port group; and the first information is transmitted through an air interface.

In one subembodiment, the gNB 410 includes a memory that stores a computer readable instruction program. The computer readable instruction program generates an action when executed by at least one processor. The action includes: transmitting first information, and receiving a first radio signal; the first information is used for indicating a first offset set, and the first offset set includes K1 first-type offset(s); time domain resources occupied by the first radio signal start from a first time, a time interval between the first time and a second time is equal to a target offset, and the target offset is one of the K1 first-type offset(s); a transmitter of the first radio signal selects the target offset from the K1 first-type offset(s) autonomously; the second time is a start time of a first time window; time domain resources occupied by the first radio signal belong to the first time window; a first antenna port group is related to the first offset set; the first antenna port group includes a positive integer number of antenna port(s); a transmitter of the first radio signal transmits the first radio signal using the first antenna port group; and the first information is transmitted through an air interface.

In one subembodiment, the UE 450 corresponds to the UE in the disclosure.

In one subembodiment, the gNB 410 corresponds to the base station in the disclosure.

In one subembodiment, at least the former two of the receiver 456, the receiving processor 452 and the controller/processor 490 are used for receiving first information.

In one subembodiment, at least the former two of the transmitter 456, the transmitting processor 455 and the controller/processor 490 are used for transmitting a first radio signal using a first antenna port group.

In one subembodiment, at least the former two of the receiver 456, the receiving processor 452 and the controller/processor 490 are used for performing an energy detection for a first frequency band.

In one subembodiment, at least the former two of the receiver 456, the receiving processor 452 and the controller/processor 490 are used for receiving second information.

In one subembodiment, at least the former two of the transmitter 416, the transmitting processor 416 and the controller/processor 440 are used for transmitting first information.

In one subembodiment, at least the former two of the receiver 456, the receiving processor 452 and the controller/processor 490 are used for receiving a first radio signal.

In one subembodiment, at least the former two of the transmitter 416, the transmitting processor 415 and the controller/processor 440 are used for transmitting second information.

Embodiment 5

Figure 5:
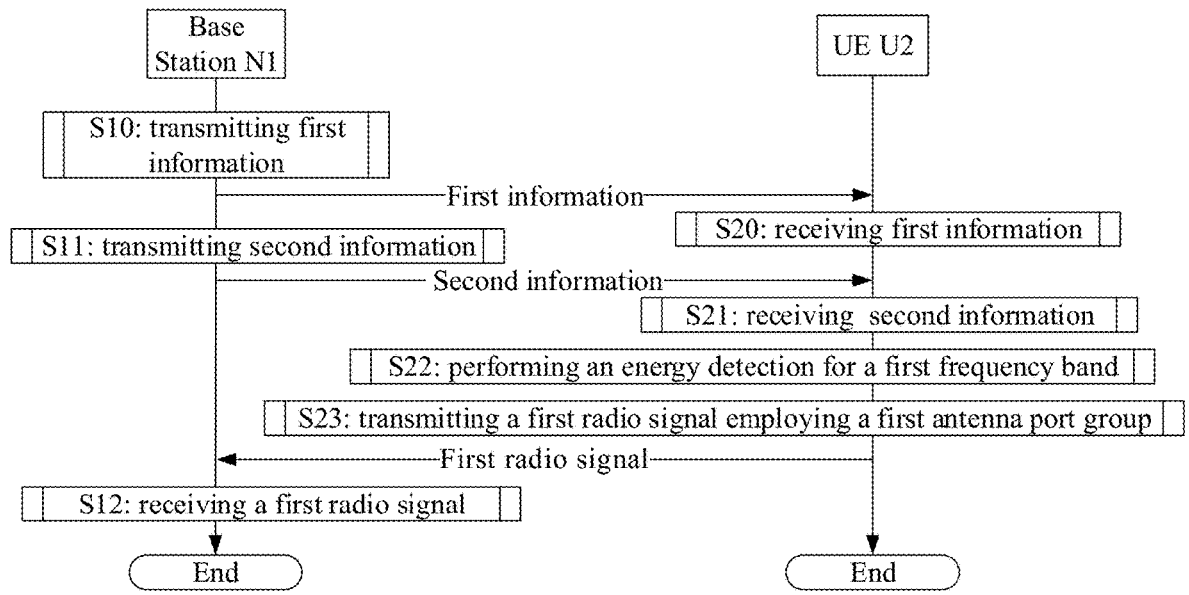
FIG. 5 is a flowchart of a first radio signal according to one embodiment of the disclosure.

Embodiment 5 illustrates a flowchart of a first radio signal, as shown in FIG. 5. In FIG. 5, a base station N1 is a maintenance base station for a serving cell of a UE U2.

The base station N1 transmits first information in S10, transmits second information in S11, and receives a first radio signal in S12.

The UE U2 receives first information in S20, receives second information in S21, performs an energy detection for a first frequency band in S22, and transmits a first radio signal using a first antenna port group in S23.

In Embodiment 5, the first information is used for indicating a first offset set, and the first offset set includes K1 first-type offset(s); time domain resources occupied by the first radio signal start from a first time, a time interval between the first time and a second time is equal to a target offset, and the target offset is one of the K1 first-type offset(s); the UE U2 selects the target offset from the K1 first-type offset(s) autonomously; the second time is a start time of a first time window; time domain resources occupied by the first radio signal belong to the first time window; the first antenna port group is related to the first offset set; the first antenna port group includes a positive integer number of antenna port(s); the first information is transmitted through an air interface; the energy detection is used for determining that the first frequency band is unoccupied, and frequency domain resources occupied by the first radio signal belong to the first frequency band; the second information is used for indicating at least one of the first time window and frequency domain resources occupied by the first radio signal; and the second information is transmitted through an air interface; the K1 is a positive integer.

In one subembodiment, the air interface in the disclosure corresponds to the interface between the UE 201 and the NR Node B 203 illustrated in Embodiment 2.

In one subembodiment, the energy detection is implemented through an energy detection method in WiFi.

In one subembodiment, the energy detection is implemented through a measurement of a Received Signal Strength Indication (RSSI).

In one subembodiment, performing an energy detection for a first frequency band refers that: the UE U2 performs Q times of energy detections in Q time subpools of a first frequency band respectively, and the Q is a positive integer greater than 1.

In one affiliated embodiment of the above subembodiment, the Q time subpools are located before the first time in time domain.

In one affiliated embodiment of the above subembodiment, one time of energy detection refers that: the UE U2 monitors a received power in a given time unit, and the given time unit belongs to one of the Q time subpools.

In one affiliated embodiment of the above subembodiment, one time of energy detection refers that: the UE U2 monitors a received energy in a given time unit, and the given time unit belongs to one of the Q time subpools.

In one affiliated embodiment of the above subembodiment, one time of energy detection refers that: the UE U2 senses all radio signals in a given frequency domain resource in a given time unit to obtain a given power; the given frequency domain resource is the first frequency band; and the given time unit belongs to one of the Q time subpools.

In one affiliated embodiment of the above subembodiment, one time of energy detection refers that: the UE U2 senses all radio signals in a given frequency domain resource in a given time unit to obtain a given energy; the given frequency domain resource is the first frequency band; and the given time unit belongs to one of the Q time subpools.

In one affiliated embodiment of the above subembodiment, the energy detection is implemented through a method defined in Chapter 15 in 3GPP TS 36.213.

In one affiliated embodiment of the above subembodiment, the energy detection is implemented through an energy detection method in LTE LAA.

In one affiliated embodiment of the above subembodiment, the energy detection is an energy detection in LBT.

In one affiliated embodiment of the above subembodiment, the energy detection is an energy detection in Clear Channel Assessment (CCA).

In one affiliated embodiment of the above subembodiment, the Q times of energy detections all correspond to a detection unit of dBm.

In one affiliated embodiment of the above subembodiment, the Q times of energy detections all correspond to a detection unit of milliwatt (mW).

In one affiliated embodiment of the above subembodiment, the Q times of energy detections all correspond to a detection unit of Joule (J).

In one affiliated embodiment of the above subembodiment, any two of the Q time subpools have an equal time length.

In one affiliated embodiment of the above subembodiment, two of the Q time subpools have an unequal time length.

In one affiliated embodiment of the above subembodiment, one of the Q time subpools has a length of 16 microseconds.

In one affiliated embodiment of the above subembodiment, an earliest time subpool among the Q time subpools has a different time length from other time subpools.

In one affiliated embodiment of the above subembodiment, any two of the Q time subpools are orthogonal in time.

In one affiliated embodiment of the above subembodiment, the Q time subpools occupy consecutive time domain resources.

In one affiliated embodiment of the above subembodiment, any two of the Q time subpools occupy inconsecutive time domain resources.

In one affiliated embodiment of the above subembodiment, any one of the Q time subpools occupies consecutive time domain resources.

In one affiliated embodiment of the above subembodiment, the Q time subpools are a listening time in Category 4 LBT.

In one affiliated embodiment of the above subembodiment, the Q time subpools include Defer slots and Back-off slots in Category 4 LBT.

In one affiliated embodiment of the above subembodiment, the phrase that the energy detection is used for determining that the first frequency band is unoccupied refers that: each one of the Q times of energy detections detects an energy lower than a first threshold, and the UE U2 determines to transmit the first radio signal starting from the first time.

In one example of the above affiliated embodiment, the first threshold is fixed, or the first threshold is configured through a higher layer signaling.

In one subembodiment, the first frequency band is one carrier.

In one subembodiment, the first frequency band is one Bandwidth Part (BWP).

In one subembodiment, the first frequency band is one portion in one carrier.

In one subembodiment, the first frequency band is one subband.

In one subembodiment, the first frequency band consists of a positive integer number of consecutive subcarriers in frequency domain.

In one subembodiment, the first frequency band has a width of 20 MHz.

In one subembodiment, the first frequency band has a width of 10 MHz.

In one subembodiment, the first frequency band has a width of 2.16 GHz.

In one subembodiment, the UE U2 performs an energy detection for the first frequency band using a first spatial receiving parameter.

In one affiliated embodiment of the above subembodiment, the first spatial receiving parameter includes at least one of a receiving analog beamforming vector, a receiving beamforming vector or a receiving analog beamforming matrix.

In one affiliated embodiment of the above subembodiment, the UE U2 deduces a spatial transmitting parameter for the first radio signal through the first spatial receiving parameter.

In one affiliated embodiment of the above subembodiment, the UE U2 deduces the first antenna port group through the first spatial receiving parameter.

In one affiliated embodiment of the above subembodiment, the base station transmits a given radio signal using a second antenna port group, the UE U2 receives the given radio signal using the first spatial receiving parameter, the second antenna port group and the first antenna port group are QCLed.

In one example of the above affiliated embodiment, the second antenna port group corresponds to one SSB.

In one example of the above affiliated embodiment, the second antenna port group is one CRI.

In one example of the above affiliated embodiment, the second antenna port group corresponds to one Channel State Information Reference Signal (CSI-RS) resource.

In one subembodiment, the second information is one RRC signaling.

In one subembodiment, the second information is one physical layer dynamic signaling.

In one subembodiment, the second information includes first sub-information and second sub-information, the first sub-information is used for indicating the first time window, and the second sub-information is used for indicating frequency domain resources occupied by the first radio signal.

In one affiliated embodiment of the above subembodiment, the first sub-information is indicated through an RRC signaling, and the second sub-information is indicated through a physical layer dynamic signaling.

In one subembodiment, the second time is a boundary of one slot.

In one subembodiment, the second time is a boundary of one subframe.

In one subembodiment, the first offset set is one subset in a first candidate offset set, the first candidate offset set includes K2 candidate offset(s), and the K2 is a positive integer not less than the K1; and at least one of the K2 or a distribution of the K2 candidate offsets in the first candidate offset set is related to a subcarrier spacing of a subcarrier included in frequency domain resources occupied by the first radio signal.

In one affiliated embodiment of the above subembodiment, the phrase that the first offset set is one subset in a first candidate offset set refers that: any one of the K1 first-type offsets included in the first offset set belongs to the first candidate offset set.

In one affiliated embodiment of the above subembodiment, the phrase that a distribution of the K2 candidate offsets in the first candidate offset set refers that: a difference between any two adjacent candidate offsets among the K2 candidate offsets is equal to R, the R is a positive integer and is in unit of microsecond, or the R is equal to a duration of a positive integer number of multicarrier symbol(s); and the R is related to a subcarrier spacing of a subcarrier included in frequency domain resources occupied by the first radio signal.

In one affiliated embodiment of the above subembodiment, target offsets included in any one of the M1 target offset sets in the disclosure belong to the first candidate offset set.

In one affiliated embodiment of the above subembodiment, at least one of the K2 or a distribution of the K2 candidate offsets in the first candidate offset set is also related to whether a Maximum Channel Occupation Time (MCOT) of the base station N1 includes time domain resources occupied by the first radio signal.

In one subembodiment, the phrase that the K2 is related to a subcarrier spacing of a subcarrier included in frequency domain resources occupied by the first radio signal refers that: if the subcarrier spacing of a subcarrier included in frequency domain resources occupied by the first radio signal is equal to P1 KHz, the K2 is equal to L1; if the subcarrier spacing of a subcarrier included in frequency domain resources occupied by the first radio signal is equal to P2 KHz, the K2 is equal to L2; the L1 and the L2 are both positive integers, and the L1 is not equal to the L2; the P1 and the P2 are both positive integral multiples of 15, and the P1 is not equal to the P2.

In one subembodiment, the phrase a distribution of the K2 candidate offsets in the first candidate offset set is related to a subcarrier spacing of a subcarrier included in frequency domain resources occupied by the first radio signal refers that: if the subcarrier spacing of a subcarrier included in frequency domain resources occupied by the first radio signal is equal to P3 KHz, a minimum candidate offset among the K2 candidate offset(s) is equal to L3; if the subcarrier spacing of a subcarrier included in frequency domain resources occupied by the first radio signal is equal to P4 KHz, a minimum candidate offset among the K2 candidate offset(s) is equal to L4; the L3 and the L4 are both positive integers, and the L3 is not equal to the L4; the P3 and the P4 are both positive integral multiples of 15, and the P3 is not equal to the P4.

In one example of the above affiliated embodiment, the K2 candidate offsets successively increase.

In one subembodiment, the first radio signal occupies a partial of one multicarrier symbol and a positive integer number of complete multicarrier symbol(s) successively in time domain, and the partial multicarrier symbol occupied by the first radio signal is a cyclic extension of an earliest complete multicarrier symbol occupied by the first radio signal.

In one affiliated embodiment of the above subembodiment, the phrase that an earliest complete multicarrier symbol occupied by the first radio signal refers that: a first multicarrier symbol in time domain among all complete multicarrier symbols occupied by the first radio signal.

In one subembodiment, the phrase that the base station N1 receives a first radio signal refers that: the base station N1 performs a blind detection of the first radio signal in the first time window.

In one subembodiment, the base station N1 receives the first radio signal in the first time window using a first candidate spatial receiving parameter.

In one affiliated embodiment of the above subembodiment, the first candidate spatial receiving parameter includes at least one of a receiving analog beamforming vector, a receiving beamforming vector or a receiving analog beamforming matrix.

In one affiliated embodiment of the above subembodiment, the first candidate spatial receiving parameter is QCLed with the first antenna port group.

In one affiliated embodiment of the above subembodiment, the first candidate spatial receiving parameter corresponds to a first receiving antenna port group, and the first receiving antenna port group is QCLed with the first antenna port group.

In one subembodiment, the base station receives the first radio signal in the first time window using M1 candidate spatial receiving parameters simultaneously; and the M1 candidate spatial receiving parameters are one-to-one corresponding to the M1 first-type antenna port groups in the disclosure.

In one affiliated embodiment of the above subembodiment, the M1 candidate spatial receiving parameters are QCLed with the M1 first-type antenna port groups respectively.

In one affiliated embodiment of the above subembodiment, the M1 candidate spatial receiving parameters are one-to-one corresponding to M1 receiving antenna port groups, the M1 receiving antenna port groups are QCLed with the M1 first-type antenna port groups respectively.

In one affiliated embodiment of the above subembodiment, the base station N1 has M1 Radio Frequency (RF) channel(s).

In one subembodiment, before the base station N1 receives the first radio signal, the base station does not know a time domain position of the first time.

In one affiliated embodiment of the above subembodiment, the base station N1 performs a blind detection of the first radio signal in the first time window starting from the second time.

Embodiment 6

Figure 6:
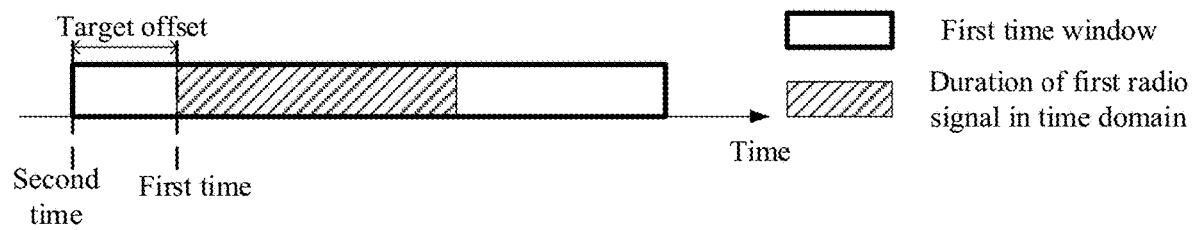
FIG. 6 is a diagram illustrating a first time and a second time according to one embodiment of the disclosure.

Embodiment 6 illustrates a diagram of a first time and a second time, as shown in FIG. 6. In FIG. 6, the second time is a start time of the first time window in the disclosure, and the first time is a start position in time domain when the UE in the disclosure transmits the first radio signal; the second time is located before the first time in time domain, and a time interval between the first time and the second time is equal to the target offset in the disclosure.

In one subembodiment, the second time is a boundary of one slot.

In one subembodiment, the second time is a boundary of one subframe.

In one subembodiment, the second time is a boundary of one mini-slot.

In one subembodiment, the UE in the disclosure and the base station in the disclosure determine the start time of the first time window after obtaining a downlink synchronization.

In one subembodiment, the UE in the disclosure and the base station in the disclosure determine the start time of the first time window after obtaining an uplink synchronization.

In one subembodiment, the UE in the disclosure and the base station in the disclosure determine the first time after obtaining a downlink synchronization.

In one subembodiment, the UE in the disclosure and the base station in the disclosure determine the first time after obtaining an uplink synchronization.

In one subembodiment, the UE transmits the first radio signal starting from the second time.

In one subembodiment, a duration of the first radio signal in time domain is fixed, or a duration of the first radio signal in time domain is configured through a higher layer signaling.

In one subembodiment, the first radio signal includes a second signaling, and the second signaling is used for determining a duration of the first radio signal in time domain.

In one affiliated embodiment of the above two subembodimemts, a duration of the first radio signal in time domain is equal to a duration of a positive integer number of multicarrier symbol(s).

In one example of the above affiliated embodiment, the positive integer number of multicarrier symbols are consecutive in time domain.

Embodiment 7

Figure 7:
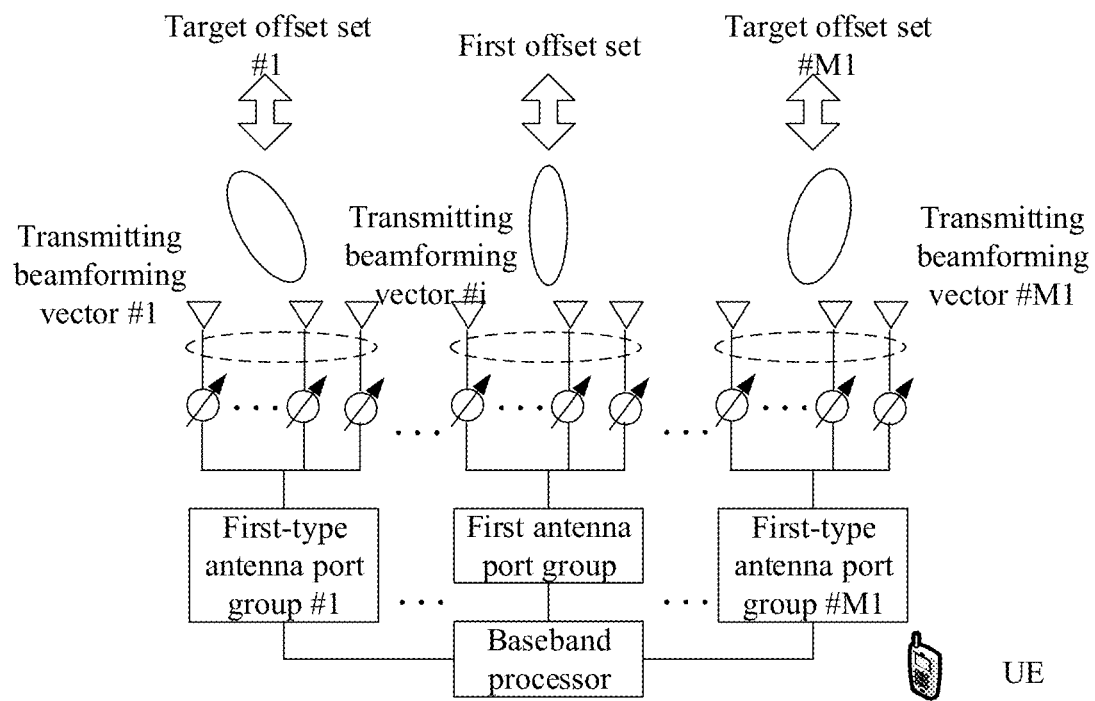
FIG. 7 is a diagram illustrating a first antenna port group according to the disclosure.

Embodiment 7 illustrates a diagram of a first antenna port group, as shown in FIG. 7. In FIG. 7, the first antenna port group is one of M1 first-type antenna port groups; the M1 first-type antenna port groups includes a first-type antenna port group #1 to a first-type antenna port group #M1, the first-type antenna port group #1 to the first-type antenna port group #M1 are one-to-one corresponding to a target offset set #1 to a target offset set #M1; the target offset set #1 to the target offset set #M1 belong to the M1 target offset sets in the disclosure; the first offset set in the disclosure is a target offset set among the M1 target offset sets that is corresponding to the first antenna port group; and the M1 first-type antenna port groups shown in FIG. 7 form M1 transmitting beamforming vectors respectively.

In one subembodiment, any one of the M1 target offset sets includes a positive integer number of target offset(s).

In one affiliated embodiment of the above subembodiment, any one of the positive integer number of target offset(s) is in unit of microsecond.

In one affiliated embodiment of the above subembodiment, any one of the positive integer number of target offset(s) is equal to a duration of a positive integer number of multicarrier symbol(s).

In one affiliated embodiment of the above subembodiment, any one of the positive integer number of target offset(s) is a positive integer.

In one affiliated embodiment of the above subembodiment, a first target offset set and a second target offset set are any two different target offset sets among the M1 target offset sets, and at least one of the target offsets included in the first target offset set does not belong to the second target offset set.

In one affiliated embodiment of the above subembodiment, a first target offset set and a second target offset set are any two different target offset sets among the M1 target offset sets, and any one of the target offsets included in the first target offset set does not belong to the second target offset set.

Embodiment 8

Figure 8:
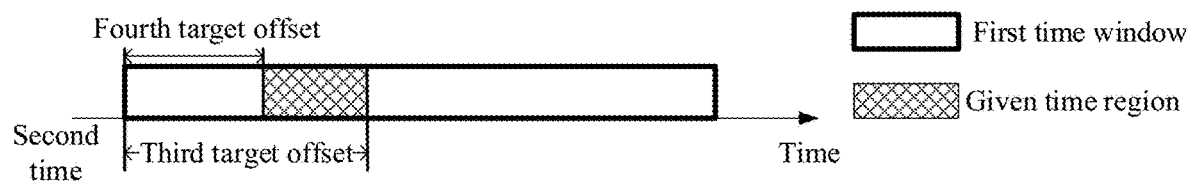
FIG. 8 is a diagram illustrating a given time region according to the disclosure.

Embodiment 8 illustrates a diagram of a given time region, as shown in FIG. 8. In FIG. 8, M1 time regions correspond to the M1 target offset sets in the disclosure respectively; the given time region is any one of the M1 time regions, and the given time region corresponds to a given target offset set among the M1 target offset sets; in the given target offset set, a maximum target offset is a third target offset, and a minimum target offset is a fourth target offset; a time interval between a start time of the given time region in time domain and the second time in the disclosure is equal to the fourth target offset, and a time interval between an end time of the given time region in time domain and the second time in the disclosure is equal to the third target offset, In one subembodiment, the given time region is a time domain range for a transmission start time of the first radio signal that is determined by the UE selecting a target offset from the given target offset set.

Embodiment 9

Figure 9:
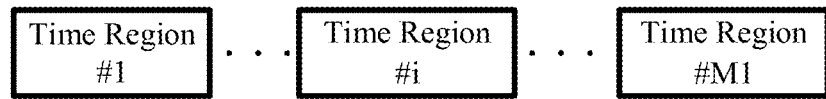
FIG. 9 is a diagram illustrating M1 time regions according to the disclosure.

Embodiment 9 illustrates a diagram of M1 time regions, as shown in FIG. 9. In FIG. 9, M1 time regions correspond to the M1 target offset sets in the disclosure respectively; and the M1 time regions are a time region #1 to a time region #M1 respectively.

In one subembodiment, any one of the M1 time regions has a duration in time domain not greater than a duration of one multicarrier symbol.

In one subembodiment, the M1 time regions are orthogonal in time domain.

In one subembodiment, at least two of the M1 time regions are overlapping in time domain.

Embodiment 10

Figure 10:
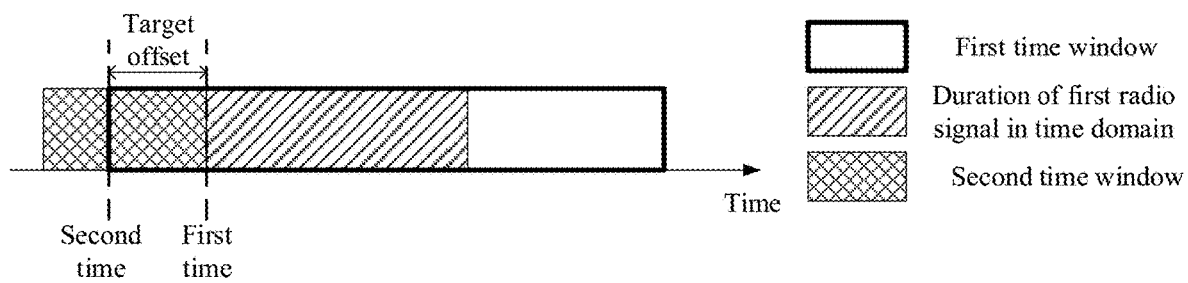
FIG. 10 is a diagram illustrating an energy detection according to the disclosure.

Embodiment 10 illustrates a diagram of an energy detection. In FIG. 10, the UE in the disclosure first determines the target offset in the disclosure, then determines the first time in the disclosure according to the target offset, and finally performs an energy detection in a second time window before the first time.

In one subembodiment, the second time window includes the Q time subpools in the disclosure.

In one subembodiment, the UE selects autonomously a start time of the second time window in time domain.

Embodiment 11

Figure 11:
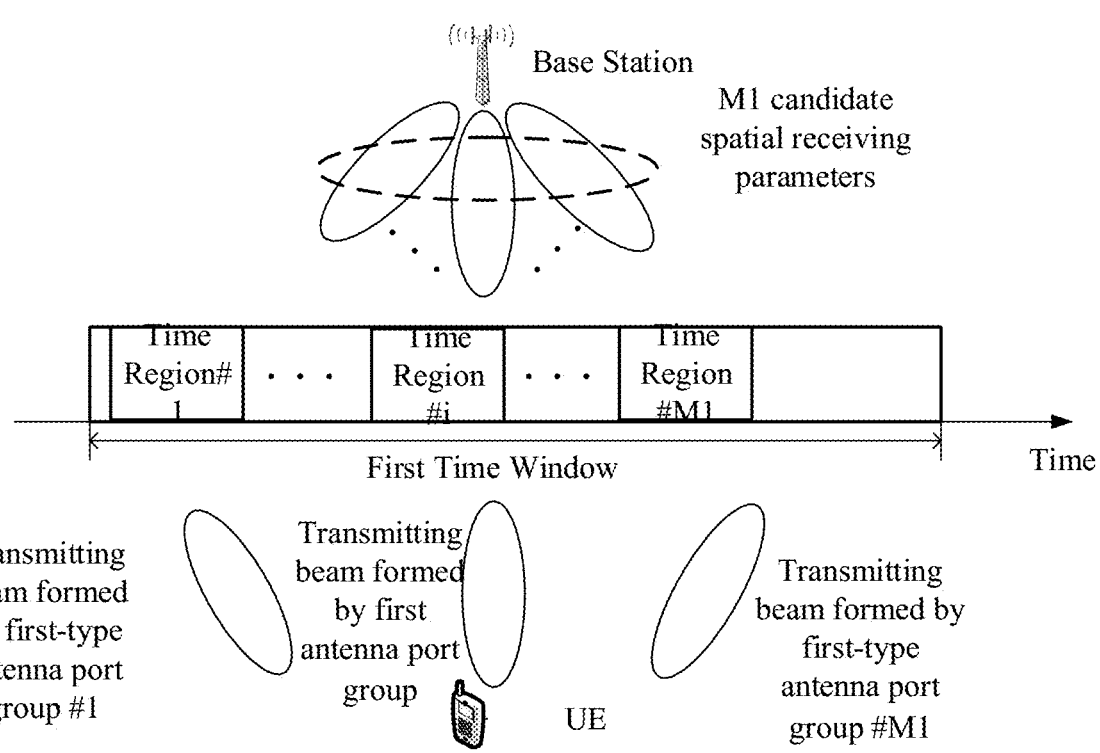
FIG. 11 is a diagram of receiving a first radio signal according to the disclosure.

Embodiment 11 illustrates a diagram of receiving a first radio signal. In FIG. 11, a base station receives the first radio signal in the first time window using M1 candidate spatial receiving parameters simultaneously; the M1 candidate spatial receiving parameters are one-to-one corresponding to the M1 first-type antenna port groups in the disclosure; for the UE in the disclosure, as shown in FIG. 11, the M1 target offset sets correspond to M1 time regions respectively, and the M1 time regions correspond to M1 transmitting beamforming vectors formed by M1 first-type antenna port groups respectively.

In one subembodiment, the UE selects a given target offset set among the M1 target offset sets, and the UE transmits the first radio signal in a given time region corresponding to the given target offset set, using a first-type antenna port group corresponding to the given target offset set.

Embodiment 12

Figure 12:
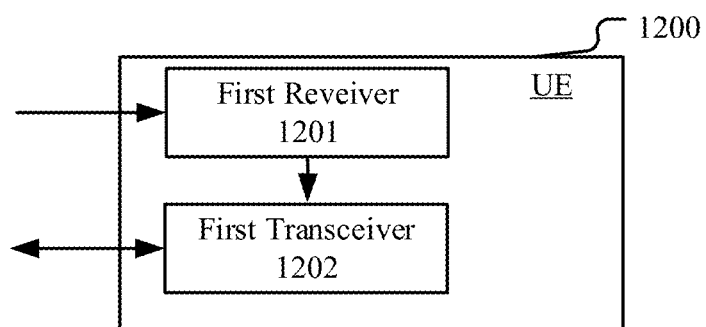
FIG. 12 is a structure block diagram illustrating a processing device in a UE according to one embodiment of the disclosure.

Embodiment 12 illustrates a structure block diagram of a processing device in a UE, as shown in FIG. 12. In FIG. 12, the processing device 1200 in the UE mainly includes a first receiver 1201 an a first transceiver 1202.

The first receiver 1201 receives first information.

The transceiver 1202 transmits a first radio signal using a first antenna port group.

In Embodiment 12, the first information is used for indicating a first offset set, and the first offset set includes K1 first-type offset(s); time domain resources occupied by the first radio signal start from a first time, a time interval between the first time and a second time is equal to a target offset, and the target offset is one of the K1 first-type offset(s); the UE selects the target offset from the K1 first-type offset(s) autonomously; the second time is a start time of a first time window; time domain resources occupied by the first radio signal belong to the first time window; the first antenna port group is related to the first offset set; the first antenna port group includes a positive integer number of antenna port(s); and the first information is transmitted through an air interface; the K1 is a positive integer.

In one subembodiment, the first transceiver 1202 also performs an energy detection for a first frequency band; the energy detection is used for determining that the first frequency band is unoccupied, and frequency domain resources occupied by the first radio signal belong to the first frequency band.

In one subembodiment, the first receiver 1201 also receives second information; the second information is used for indicating at least one of the first time window and frequency domain resources occupied by the first radio signal; and the second information is transmitted through an air interface.

In one subembodiment, the first offset set is one subset in a first candidate offset set, the first candidate offset set includes K2 candidate offset(s), and the K2 is a positive integer not less than the K1; and at least one of the K2 or a distribution of the K2 candidate offsets in the first candidate offset set is related to a subcarrier spacing of a subcarrier included in frequency domain resources occupied by the first radio signal.

In one subembodiment, the first radio signal occupies a partial of one multicarrier symbol and a positive integer number of complete multicarrier symbol(s) successively in time domain, and the partial multicarrier symbol occupied by the first radio signal is a cyclic extension of an earliest complete multicarrier symbol occupied by the first radio signal.

In one subembodiment, the first receiver 1201 includes at least the former two of the receiver 456, the receiving processor 452 and the controller/processor 490 illustrated in Embodiment 4.

In one subembodiment, the first transceiver 1202 includes at least the former four of the transmitter/receiver 456, the transmitting processor 455, the receiving processor 452 and the controller/processor 490 illustrated in Embodiment 4.

Embodiment 13

Figure 13:
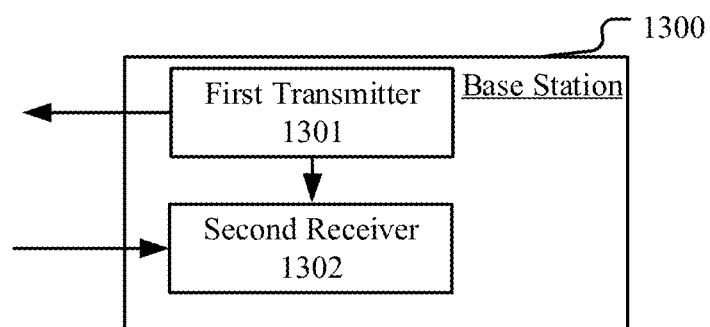
FIG. 13 is a structure block diagram illustrating a processing device in a base station according to one embodiment of the disclosure.

Embodiment 13 illustrates a structure block diagram of a processing device in a base station, as shown in FIG. 13. In FIG. 13, the processing device 1300 in the base station mainly includes a first transmitter 1301 and a second receiver 1302.

The first transmitter 1301 transmits first information.

The second transceiver 1302 receives a first radio signal.

In Embodiment 13, the first information is used for indicating a first offset set, and the first offset set includes K1 first-type offset(s); time domain resources occupied by the first radio signal start from a first time, a time interval between the first time and a second time is equal to a target offset, and the target offset is one of the K1 first-type offset(s); a transmitter of the first radio signal selects the target offset from the K1 first-type offset(s) autonomously; the second time is a start time of a first time window; time domain resources occupied by the first radio signal belong to the first time window; a first antenna port group is related to the first offset set; the first antenna port group includes a positive integer number of antenna port(s); a transmitter of the first radio signal transmits the first radio signal using the first antenna port group; and the first information is transmitted through an air interface; the K1 is a positive integer.

In one subembodiment, the first transmitter 1301 also transmits second information; the second information is used for indicating at least one of the first time window and frequency domain resources occupied by the first radio signal; and the second information is transmitted through an air interface.

In one subembodiment, the first offset set is one subset in a first candidate offset set, the first candidate offset set includes K2 candidate offset(s), and the K2 is a positive integer not less than the K1; and at least one of the K2 or a distribution of the K2 candidate offsets in the first candidate offset set is related to a subcarrier spacing of a subcarrier included in frequency domain resources occupied by the first radio signal.

In one subembodiment, the first radio signal occupies a partial of one multicarrier symbol and a positive integer number of complete multicarrier symbol(s) successively in time domain, and the partial multicarrier symbol occupied by the first radio signal is a cyclic extension of an earliest complete multicarrier symbol occupied by the first radio signal.

In one subembodiment, the first transmitter 1301 includes at least the former two of the transmitter 416, the transmitting processor 415 and the controller/processor 440 illustrated in Embodiment 4.

In one subembodiment, the second receiver includes at least the former two of the receiver 416, the receiving processor 412 and the controller/processor 440 illustrated in Embodiment 4.

The ordinary skill in the art may understand that all or part steps in the above method may be implemented by instructing related hardware through a program. The program may be stored in a computer readable storage medium, for example Read-Only Memory (ROM), hard disk or compact disc, etc. Optionally, all or part steps in the above embodiments also may be implemented by one or more integrated circuits. Correspondingly, each module unit in the above embodiment may be realized in the form of hardware, or in the form of software function modules. The disclosure is not limited to any combination of hardware and software in specific forms. The UE and terminal in the disclosure include but not limited to unmanned aerial vehicles, communication modules on unmanned aerial vehicles, telecontrolled aircrafts, aircrafts, diminutive airplanes, mobile phones, tablet computers, notebooks, vehicle-mounted communication equipment, wireless sensor, network cards, terminals for Internet of Things, REID terminals, NB-IOT terminals, Machine Type Communication (MTC) terminals, enhanced MTC (eMTC) terminals, data cards, low-cost mobile phones, low-cost tablet computers, and other radio communication equipment. The base station in the disclosure includes but not limited to macro-cellular base stations, micro-cellular base stations, home base stations, relay base station, gNB, TRP, and other radio communication equipment.

The above are merely the preferred embodiments of the disclosure and are not intended to limit the scope of protection of the disclosure. Any modification, equivalent substitute and improvement made within the spirit and principle of the disclosure are intended to be included within the scope of protection of the disclosure.

What is claimed is:

1. A User Equipment (UE) for wireless communication, comprising:
 a first receiver, to receive first information; and
 a first transceiver, to transmit a first radio signal using a first antenna port group;
 wherein the first information is used for indicating a first offset set, and the first offset set comprises K1 first-type offsets;
 time domain resources occupied by the first radio signal start from a first time, a time interval between the first time and a second time is equal to a target offset, and the target offset is one of the K1 first-type offsets;
the UE selects the target offset from the K1 first-type offsets autonomously;
the second time is a start time of a first time window;
time domain resources occupied by the first radio signal belong to the first time window;
the first antenna port group is related to the first offset set;
the first antenna port group comprises a positive integer number of antenna ports;
and the first information is transmitted through an air interface;
the K1 is a positive integer;
the first radio signal occupies a partial of one multicarrier symbol and a positive integer number of complete multicarrier symbols successively in time domain, and the partial of one multicarrier symbol occupied by the first radio signal is a cyclic extension of an earliest complete multicarrier symbol occupied by the first radio signal;
wherein, the UE selecting the target offset from the K1 first-type offsets autonomously refers to:
the UE randomly selecting one first-type offset from the K1 first-type offsets as the target offset;
the first radio signal is transmitted on a Physical Uplink Shared Channel.

2. The UE according to claim 1, wherein the first transceiver performs an energy detection for a first frequency band;
the energy detection is used for determining that the first frequency band is unoccupied, and frequency domain resources occupied by the first radio signal belong to the first frequency band.

3. The UE according to claim 1, wherein the first receiver receives second information;
the second information is used for indicating at least one of the first time window and frequency domain resources occupied by the first radio signal; and
the second information is transmitted through an air interface.

4. The UE according to claim 1, wherein the first offset set is one subset in a first candidate offset set, the first candidate offset set comprises K2 candidate offsets, and the K2 is a positive integer greater than or equal to the K1; and
at least one of the K2 or a distribution of the K2 candidate offsets in the first candidate offset set is related to a subcarrier spacing of a subcarrier comprised in frequency domain resources occupied by the first radio signal.

5. The UE according to claim 1, wherein the first antenna port group is one of M1 first-type antenna port groups, the M1 first-type antenna port groups are one-to-one corresponding to M1 target offset sets, and the first offset set is a target offset set among the M1 target offset sets that is corresponding to the first antenna port group;
the M1 first-type antenna port groups correspond to M1 Sounding Reference Signaling Resource Indicators SRIs respectively, or the M1 first-type antenna port groups correspond to M1 Channel State Information Reference Signal Resource Indicators CRIs respectively, or the M1 first-type antenna port groups correspond to M1 SS/PBCH Blocks SSBs respectively.

6. The UE according to claim 4, wherein when the K2 is related to a subcarrier spacing of a subcarrier comprised in frequency domain resources occupied by the first radio signal, if the subcarrier spacing of a subcarrier comprised in frequency domain resources occupied by the first radio signal is equal to P1 KHz, the K2 is equal to L1;
if the subcarrier spacing of a subcarrier comprised in frequency domain resources occupied by the first radio signal is equal to P2 KHz, the K2 is equal to L2;
the L1 and the L2 are both positive integers, and the L1 is not equal to the L2;
the P1 and the P2 are both positive integral multiples of 15, and the P1 is not equal to the P2; or,
when a distribution of the K2 candidate offsets in the first candidate offset set is related to a subcarrier spacing of a subcarrier comprised in frequency domain resources occupied by the first radio signal, if the subcarrier spacing of a subcarrier comprised in frequency domain resources occupied by the first radio signal is equal to P3 KHz, a minimum candidate offset among the K2 candidate offsets is equal to L3;
if the subcarrier spacing of a subcarrier comprised in frequency domain resources occupied by the first radio signal is equal to P4 KHz, a minimum candidate offset among the K2 candidate offsets is equal to L4;
the L3 and the L4 are both positive integers, and the L3 is not equal to the L4;
the P3 and the P4 are both positive integral multiples of 15, and the P3 is not equal to the P4.

7. The UE according to claim 1, wherein the first information is one Radio Resource Control (RRC) signaling.

8. The UE according to claim 1, wherein the transmission of the first radio signal is grant free.

9. The UE according to claim 3, wherein the second information is one Radio Resource Control (RRC) signaling.

10. A base station for wireless communication, comprising:
a first transmitter, to transmit first information; and
a second transceiver, to receive a first radio signal;
wherein the first information is used for indicating a first offset set, and the first offset set comprises K1 first-type offsets;
time domain resources occupied by the first radio signal start from a first time, a time interval between the first time and a second time is equal to a target offset, and the target offset is one of the K1 first-type offsets;
a transmitter of the first radio signal selects the target offset from the K1 first-type offsets autonomously;
the second time is a start time of a first time window;
time domain resources occupied by the first radio signal belong to the first time window;
a first antenna port group is related to the first offset set;
the first antenna port group comprises a positive integer number of antenna ports;
a transmitter of the first radio signal transmits the first radio signal using the first antenna port group; and
the first information is transmitted through an air interface;
the K1 is a positive integer;
the first radio signal occupies a partial of one multicarrier symbol and a positive integer number of complete multicarrier symbols successively in time domain, and the partial of one multicarrier symbol occupied by the first radio signal is a cyclic extension of an earliest complete multicarrier symbol occupied by the first radio signal;
wherein, the transmitter of the first radio signal selecting the target offset from the K1 first-type offsets autonomously refers to:

the transmitter of the first radio signal randomly selecting one first-type offset from the K1 first-type offsets as the target offset;
the first radio signal is transmitted on a Physical Uplink Shared Channel.

11. The base station according to claim 10, wherein the first transmitter transmits second information;
the second information is used for indicating at least one of the first time window and frequency domain resources occupied by the first radio signal; and
the second information is transmitted through an air interface.

12. The base station according to claim 10, wherein the first offset set is one subset in a first candidate offset set, the first candidate offset set comprises K2 candidate offsets, and the K2 is a positive integer greater than or equal to the K1; and
at least one of the K2 or a distribution of the K2 candidate offsets in the first candidate offset set is related to a subcarrier spacing of a subcarrier comprised in frequency domain resources occupied by the first radio signal.

13. The base station according to claim 10, wherein the first antenna port group is one of M1 first-type antenna port groups, the M1 first-type antenna port groups are one-to-one corresponding to M1 target offset sets, and the first offset set is a target offset set among the M1 target offset sets that is corresponding to the first antenna port group;
the M1 first-type antenna port groups correspond to M1 SRIs respectively, or the M1 first-type antenna port groups correspond to M1 CRIs respectively, or the M1 first-type antenna port groups correspond to M1 SSBs respectively.

14. The base station according to claim 12, wherein when the K2 is related to a subcarrier spacing of a subcarrier comprised in frequency domain resources occupied by the first radio signal, if the subcarrier spacing of a subcarrier comprised in frequency domain resources occupied by the first radio signal is equal to P1 KHz, the K2 is equal to L1;
if the subcarrier spacing of a subcarrier comprised in frequency domain resources occupied by the first radio signal is equal to P2 KHz, the K2 is equal to L2;
the L1 and the L2 are both positive integers, and the L1 is not equal to the L2;
the P1 and the P2 are both positive integral multiples of 15, and the P1 is not equal to the P2; or,
when a distribution of the K2 candidate offsets in the first candidate offset set is related to a subcarrier spacing of a subcarrier comprised in frequency domain resources occupied by the first radio signal, if the subcarrier spacing of a subcarrier comprised in frequency domain resources occupied by the first radio signal is equal to P3 KHz, a minimum candidate offset among the K2 candidate offsets is equal to L3;
if the subcarrier spacing of a subcarrier comprised in frequency domain resources occupied by the first radio signal is equal to P4 KHz, a minimum candidate offset among the K2 candidate offsets is equal to L4;
the L3 and the L4 are both positive integers, and the L3 is not equal to the L4;
the P3 and the P4 are both positive integral multiples of 15, and the P3 is not equal to the P4.

15. A method in a UE for wireless communication, comprising:
receiving first information; and
transmitting a first radio signal using a first antenna port group;
wherein the first information is used for indicating a first offset set, and the first offset set comprises K1 first-type offsets;
time domain resources occupied by the first radio signal start from a first time, a time interval between the first time and a second time is equal to a target offset, and the target offset is one of the K1 first-type offsets;
the UE selects the target offset from the K1 first-type offsets autonomously;
the second time is a start time of a first time window;
time domain resources occupied by the first radio signal belong to the first time window;
the first antenna port group is related to the first offset set;
the first antenna port group comprises a positive integer number of antenna ports; and
the first information is transmitted through an air interface;
the K1 is a positive integer;
the first radio signal occupies a partial of one multicarrier symbol and a positive integer number of complete multicarrier symbols successively in time domain, and the partial of one multicarrier symbol occupied by the first radio signal is a cyclic extension of an earliest complete multicarrier symbol occupied by the first radio signal;
wherein, the UE selecting the target offset from the K1 first-type offsets autonomously refers to:
the UE randomly selecting one first-type offset from the K1 first-type offsets as the target offset;
the first radio signal is transmitted on a Physical Uplink Shared Channel.

16. The method according to claim 15, comprising:
performing an energy detection for a first frequency band;
wherein the energy detection is used for determining that the first frequency band is unoccupied, and frequency domain resources occupied by the first radio signal belong to the first frequency band.

17. The method according to claim 15, comprising:
receiving second information;
wherein the second information is used for indicating at least one of the first time window and frequency domain resources occupied by the first radio signal; and
the second information is transmitted through an air interface.

18. The method according to claim 15, wherein the first offset set is one subset in a first candidate offset set, the first candidate offset set comprises K2 candidate offsets, and the K2 is a positive integer greater than or equal to the K1; and
at least one of the K2 or a distribution of the K2 candidate offsets in the first candidate offset set is related to a subcarrier spacing of a subcarrier comprised in frequency domain resources occupied by the first radio signal.

19. The method according to claim 15, wherein the first antenna port group is one of M1 first-type antenna port groups, the M1 first-type antenna port groups are one-to-one corresponding to M1 target offset sets, and the first offset set is a target offset set among the M1 target offset sets that is corresponding to the first antenna port group;
the M1 first-type antenna port groups correspond to M1 SRIs respectively, or the M1 first-type antenna port groups correspond to M1 CRIs respectively, or the M1 first-type antenna port groups correspond to M1 SSBs respectively.

20. The method according to claim 18, wherein when the K2 is related to a subcarrier spacing of a subcarrier comprised in frequency domain resources occupied by the first radio signal, if the subcarrier spacing of a subcarrier comprised in frequency domain resources occupied by the first radio signal is equal to P1 KHz, the K2 is equal to L1;
- if the subcarrier spacing of a subcarrier comprised in frequency domain resources occupied by the first radio signal is equal to P2 KHz, the K2 is equal to L2;
- the L1 and the L2 are both positive integers, and the L1 is not equal to the L2;
- the P1 and the P2 are both positive integral multiples of 15, and the P1 is not equal to the P2; or,
- when a distribution of the K2 candidate offsets in the first candidate offset set is related to a subcarrier spacing of a subcarrier comprised in frequency domain resources occupied by the first radio signal, if the subcarrier spacing of a subcarrier comprised in frequency domain resources occupied by the first radio signal is equal to P3 KHz, a minimum candidate offset among the K2 candidate offsets is equal to L3;
- if the subcarrier spacing of a subcarrier comprised in frequency domain resources occupied by the first radio signal is equal to P4 KHz, a minimum candidate offset among the K2 candidate offsets is equal to L4;
- the L3 and the L4 are both positive integers, and the L3 is not equal to the L4;
- the P3 and the P4 are both positive integral multiples of 15, and the P3 is not equal to the P4.

* * * * *